United States Patent [19]

Yen et al.

[11] 4,035,316
[45] July 12, 1977

[54] CELL SPECIFIC, VARIABLE DENSITY, POLYMER MICROSPHERES

[75] Inventors: Shiao-Ping S. Yen; Alan Rembaum, both of Altadena; Robert S. Molday, Pasadena, all of Calif.

[73] Assignee: California Institute of Technology, Pasadena, Calif.

[21] Appl. No.: 634,929

[22] Filed: Nov. 24, 1975

[51] Int. Cl.² .......................................... C08J 9/16
[52] U.S. Cl. ................................. 260/2.5 B; 260/8; 260/46.5 UA; 260/63 HA; 260/63 N; 260/63 BB; 260/65; 526/225; 526/229; 526/245; 526/251; 526/279; 526/296; 526/303; 526/306; 526/307; 526/317; 526/320; 526/328; 526/329
[58] Field of Search ................................. 260/2.5 B

[56] References Cited

U.S. PATENT DOCUMENTS 3,957,741  5/1976  Rembaum et al. .............. 260/2.5 B Primary Examiner—Morton Foelak
Attorney, Agent, or Firm—Marvin E. Jacobs

[57] ABSTRACT

Biocompatible polymeric microspheres having an average diameter below about 3 microns and having density at least 15% greater or lesser than organic cells and having covalent binding sites are provided in accordance with this invention. The microspheres are obtained by copolymerizing a hydroxy or amine substituted acrylic monomer such as hydroxyethylmethacrylate with a light or dense comonomer such as a fluoromonomer. A lectin or antibody is bound to the hydroxy or amine site of the bead to provide cell specificity. When added to a cell suspension the marked bead will specifically label the cell membrane by binding to specific receptor sites thereon. The labelled membrane can then be separated by density gradient centrifugation.

16 Claims, No Drawings

CELL SPECIFIC, VARIABLE DENSITY, POLYMER MICROSPHERES

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2457).

BACKGROUND OF THE INVENTION

1. Field of the Invention

The present invention relates to uniformly sized polymeric microspheres, to methods of making the microspheres and to their use in labelling cell surfaces.

2. Description of the Prior Art

The isolation and characterization of cell membranes and their components is essential for an understanding of the role in which surface membranes play in regulating a wide variety of biological and immunological activities. The present techniques used for this purpose are unsatisfactory.

Most biological studies depend on the knowledge of cell membrane structure and its surface properties because cell functions are controlled by surface interactions between cell membranes and their environment. Thus the cell membrane properties determine the uptake of nutrients, growth, adhesion to other cells or artificial surfaces, removal of foreign particles (phagocytosis) etc. Of particular interest are the cell membrane receptors of normal and transformed cells and the interaction of specific sites on the membrane with chemotherapeutic or cytotoxic agents. Information on this interaction is necessary for practical applications, e.g., development of diagnostic tests or destruction of diseased cells. The separation of cell membranes and the isolation of cell receptors is the first step in the study of their properties or their interaction with natural or foreign elements. Although several methods of membrane separation are at present used and new methods are being investigated, none of them is satisfactory and a good technique for isolation of specific sites on the membrane surface is non-existent.

Knowledge of the nature, number and distribution of specific receptors on cell surfaces is of central importance for an understanding of the molecular basis underlying such biological phenomena as cell—cell recognition in development, cell communication and regulation by hormones and chemical transmitters, and differences in normal and tumor cell surfaces. In previous studies, the localization of antigens and carbohydrate residues on the surface of cells, notably red blood cells and lymphocytes, has been determined by bonding antibodies or lectins to such macromolecules as ferritin, hemocyanin or peroxidase which have served as markers for transmission electron microscopy. With advances in high resolution scanning electron microscopy (SEM), however, the topographical distribution of molecular receptors on the surfaces of cell and tissue specimens can be readily determined by similar histochemical techniques using newly developed markers resolvable by SEM.

Recently commercially available polystyrene latex particles have been utilized as immunologic markers for use in the SEM technique. The surface of such polystyrene particles is hydrophobic and hence certain types of macromolecules such as antibodies are adsorbed on the surface under carefully controlled conditions. However, such particles stick non-specifically to many surfaces and molecules and this seriously limits their broad application. Though these particles, while of the proper density for separating adsorbed or labelled membranes from other membranes are uncharged and are not capable of any derivitization by ionic or covalent bonding of protein and other biological molecules, and are thus limited in use to generalized studies on phagocytosis.

The preparation of small, stable, spherical particles which are bio-compatible, i.e., do not interact non-specifically with cells or other biological components and which contain functional groups to which specific proteins and other bio-chemical molecules can be covalently bonded is disclosed in copending application Ser. No. 434,124, filed Jan. 17, 1974, now U.S. Pat. No. 3,957,741, issued May 18, 1976.

The hydroxyl or amino groups can be activated by cyanogen bromide for covalent bonding of proteins and other chemicals containing amino groups to the polymeric latex. Methacrylic acid residues which impart a negative charge onto the particles are likely to prevent non-specific binding to cell surfaces and to provide carboxyl groups to which a variety of bio-chemical molecules can be covalently bonded using the carbodiimide method. Cross-linking of the polymeric matrix is essential to maintain the stability and size of the particles in both aqueous solution and in organic solvents commonly used in the fixation and dehydration of biological specimens for electron or light microscopy.

The polymeric microspheres ranging in diameter from 300 to 2000A have been successfully utilized as biocompatible immunochemical markers of red blood cells and lymphocytes in scanning electric and light microscopy. However, the density of the microspheres is so close to that of the cell membranes that isolation of the cell membranes or bound receptor sites is not possible.

SUMMARY OF THE INVENTION

Amine-, hydroxyl- and/or carboxyl-substituted microspheres are provided in accordance with the invention having a density of at least 1.30 g/cc, preferably above 1.40 g/cc, or a density below 1.15 g/cc preferably below 1.08 g/cc. The density of cellular organelles is of the order of about 1.20 g/cc. The beads of the invention being considerably smaller than biological cells and being capable of binding a protein conjugate can attach to specific receptor sites on the surface of the cell membrane and after fragmentation of the membrane can be recovered by sedimentation or centrifugation techniques.

The microspheres will find use in lectin, antibody or sugar derivatized forms. They can be used to isolate membrane fragments enriched for the appropriate cellular ligand(s) which bind to the substance covalently attached to the bead. The microspheres currently available permit no more than an assessment of the cellular materials which can be labeled by agents which cannot penetrate membranes, thus greatly restricting the amount of useful information obtained.

The microspheres can be utilized to yield a biochemical mapping of the membrane with respect to assessment of surface receptors which can redistribute in the plane of the membrane in response to a matrix containing rigidly displayed ligands. This will be useful in determining the contributing roles of the restriction of movement of certain surface receptors to oncogenic transformation of cells. Other applications include the isolation of differentiated regions of cell surface membranes, and studies of this nature would be of great utility in areas such as development biology.

The microspheres are synthesized by free radical initiated emulsion polymerization or high energy radiation induced copolymerizaton of a first ethylenically unsaturated monomer containing a covalently bondable moiety such as hydroxyl, primary amine or carboxyl, and ethylenically unsaturated comonomer having a density differing from the monomer by at least 15 percent and a cross-linking agent to form small, round, microspheres at least 80% of which have a uniform diameter below 5 microns, and preferably below 1 micron, suitably 300 to 2000 A. The microspheres have a density above 1.3 or below 1.15 g/cc, are hydrophilic, hydrolytically stable, are biocompatible and have of sufficient mechanical strength to be useful as an absorbent in column or film chromotography, gel filtration and permeation, separation and analysis. The microspheres are of well characterized structure, of outstanding purity and the hydrophilic properties, size and mechanical properties can be systematically varied by selection of monomer and polymerization conditions.

The microspherical beads containing hydroxyl, carboxyl or amine groups can be covalently bonded to antibodies and other biological materials and are useful as specific cell surface markers for scanning electron microscopy. The particles are found to bind to hormones, toxins, lectins, and other molecules and have application in the detection and localization of a variety of cell surface receptors. Particles tagged with fluorescent dye or radioactive molecules serve as sensitive markers for fluorescent microscopy and as reagents for quantitative study of cell surface components by covalently bonding lectins, antigens, hormones and other molecules to these spheres, and detection and localization of specific carbohydrate residues. Antibodies, hormone receptors and other specific cell surface components can also be determined. These reagents also have application in highly sensitive radioimmune assays, as visual markers for fluorescent and transmission electron microcsopy, for radioactive quantitation of specific cell surface receptors and as potential therapeutic reagents.

Technique for isolation of cell membranes and membrane receptors comprises the steps of covalently bonding an antibody or antigen molecule to the microspheres. The bonded microspheres are then to be added to cells to label and bind to specific conjugate receptor, antigen or antibody, sites on the cell membrane. The labeled cells are then disrupted into fragments by nitrogen decompression, homogenization or other standard procedure. The membrane fragments are then centrifuged to equilibrium on linear density gradients.

These and other attendant advantages of the invention will become apparent as the invention becomes better understood by reference to the following detailed descriptions.

DESCRIPTION OF THE PREFERRED EMBODIMENTS

The total monomer concentration is maintained between 1 to 40% by weight preferably from 3 to 30% by weight of the polymerization mixture. By utilizing low monomer concentration and quick and uniform initiation, as disclosed in copending application Ser. No. 634,935, filed concurrently herewith, small microspheres of more uniform diameter are formed.

The first covalently bondable monomer is suitably a primary amine, carboxyl, or hydroxyl substituted acrylic monomer and should comprise at least 10% by weight of the monomer mixture, generally from 20 to 60% thereof. Exemplary monomers are acrylamide, an hydroxy lower alkyl acrylate an amino lower alkyl acrylate, acrylic acid, methacrylic acid or the like. Representative monomers may be selected from compounds of the formula:

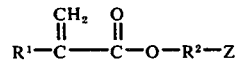

where $R^1$ is hydrogen or lower alkyl of 1–8 carbon atoms, $R^2$ is alkylene of 1–12 carbon atoms, Z is OH or $R^3$—N—$R^4$ where $R^3$ or $R^4$ are H, lower alkyl or lower alkoxy. 2-hydroxyethylmethacrylate, 3-hydroxypropyl methacrylate, 2-dimethylaminoethyl methacrylate and 2-aminoethyl methacrylate are readily available commercially.

Minor amounts of 0.35%, suitably 10–25% by weight of the monomer mixture may comprise a compatible comonomer such as a lower alkyl methacrylate, acrylic or methacrylic acid, styrene or vinyl toluene.

The cross-linking agent is present in the monomer mixture in an amount from 1 to 10% and is a liquid polyunsaturated compound such as a diene or a triene capable of addition polymerization with the unsaturated group of the monomer. Suitable compounds are low molecular weight liquid polyvinyl compounds such as ethylene glycol dimethacrylate (EGD), divinyl benzene, trimethylol propane trimethacrylate and N,N'-methylene-bis-acrylamide.

A commercial form (95%) of hydroxyethylmethacrylate (HEMA) and hydroxypropyl methacrylate (HPMA) as supplied, contains small amounts of methacrylic acid, hydroxyalkoxyalkylmethacrylate and dimethacrylates — ethylene dimethacrylate in HEMA and propylene dimethacrylate in HPMA. HPMA is generally a mixture in which the principal monomers comprise 68–75% of 2-hydroxypropyl and 25–32% of 1-methyl-2-hydroxyethylmethacrylate.

The variable density commonomer is present in the monomer mixture in an amount sufficient to raise or lower the density to the desired range. It is to be realized that the cross-linked microspheres have a greater density than the monomers. The acrylic monomers and comonomers generally have a density of about 0.9 to 1.0 g/cc and they form microspheres having a density of about 1.24 g/cc. If one half of the hydroxyethylmethacrylate monomer is replaced with a monomer such as trifluoroethyl methacrylate which has a density of 1.16 g/cc, about 30% higher, the resulting microsphere would have a density of about 1.42.

The heaviest known comonomers have a density of about 1.6 g/cc and the lightest about 0.78 g/cc. Thus the minimum amount of variable density of comonomer should be about 25% by weight. The maximum amount is only limited by the amount of first monomer and combatible reactivity considerations. Representative variable density comonomers are provided in the following table.

Table 1

| Comonomer | Density, g/cc |
|---|---|
| Trifluoroethyl methacrylate (TFEM) | 1.16 |
| Pentafluorostyrene | 1.412 |
| Vinyl ethyl ketone | 0.985 |
| Vinyl ethyl ether | 0.76 |
| Vinyl iodide | |
| Vinyl bromide | 1.5 |
| Hexafluoropropyl methacrylate | 1.16 |
| Methacryloxymethylpentamethyl disiloxane | 0.903 |
| 1,3-Bis (methacryloxymethyl)-disiloxane | 0.996 |

Emulsion polymerization is conducted at temperatures from about 60° to 120°.C with agitation in presence of an inert gas such as nitrogen or argon in the presence of an emulsifier and free radical inhibitor. The monomers, emulsifier and inhibitor are introduced into distilled water in a container. The container is immersed in a heated bath. In about 1 hour nearly quantitative yields are achieved. Emulsifier and other ionic impurities are removed from the latex suspension on a mixed-bed ion exchange column and the microsphere particles are then dried. The density of the particles is then determined by centrifugation at 100,000 g for 12 hours on a linear sucrose gradient. The diameter of the particles was measured by transmission and scanning electron microscopy.

The surface active emulsifying agent is preferably present in an amount below 10% by weight of the monomer mixture, typically from 2-5% thereof, to minimize the after treatment for removal of the agent from the microsphere suspension. Suitable agents are ionic materials such as sodium dodecyl sulfate (SDS), sodium lauryl sulfate, sodium stearate or non ionic materials such as polyethylene oxide lauryl ether.

The free radical initiator may be present in amounts from 0.01 to 3% by weight of the monomer mixture and may be a persulfate, peroxide, azo or redox material. Suitable materials are ammonium persulfate (AP), benzoyl peroxide, lauroyl peroxide, t-butyl hydroperoxide, t-butyl perbenzoate, cumene peroxide, azodiisobutyronitrile, azodiisobutyro-amide or mixtures thereof with reducing agents such as sodium bifulfite or sodium thiosulfate.

Examples of practice follow:

EXAMPLE 1

0.9 grams of 2-hydroxethyl methacrylate (HEMA), 0.3 grams of methacrylic acid (MAA), 1.5 grams of hexafluoroisopropyl methacrylate and 0.3 g of bis-acrylamide were combined with distilled water to form a 3% total monomer solution. 0.12 grams of SDS and 0.012 g of AP were added and the container inbited with argon was placed in a tumbling container and inserted in a 98° C bath for 1 hour.

400A diameter microspheres in 99% yield having a density of 1.46 g/cc were recovered. Density was determined by means of a cesium chloride density gradient.

EXAMPLE 2

The same conditions as Example 1 were followed except that the following monomers were used:

| trifluoroethyl methacrylate | 6.51 g |
|---|---|
| ethylene glycol dimethacrylate | 0.49 g |

Density of beads produced >1.41 as determined on a sucrose gradient.

EXAMPLE 3

The same conditions as Example 1 were followed except for the following monomer composition:

| 2-hydroxyethyl methacrylate | 0.7 g |
|---|---|
| methacrylic acid | 0.7 g |
| trifluoroethyl methacrylate | 5.11 g |
| ethylene glycol dimethacrylate | 0.49 g |

The density was 1.31 g as determined on a sucrose gradient.

EXAMPLE 4

Identical conditions to Example 1 except for the following monomer composition:

| HEMA | 1.4 g |
|---|---|
| MAA | 0.7 g |
| TFEM | 4.41 g |
| EGD | .49 g |

Density was 1.305 g as determined on a sucrose gradient.

EXAMPLE 5

Identical conditions to Example 1 except for the following monomer composition:

| HEMA | 2.1 g |
|---|---|
| MAA | 0.7 g |
| TFEM | 3.71 g |
| EGD | 0.49 g |

Density was 1.265 g as determined on a sucrose gradient.

Flourescent or radioactive tagged beads can be prepared by covalently binding glycine or dansyl-e-lysine by the cyanogen bromide procedure disclosed by Cuatrecasas, 1970, J. Biol. Chem. 245:3059 and as disclosed in copending application Ser. No. 634,935 filed concurrently herewith, the disclosure of which is incorporated herein by reference.

An aqueous suspension of the beads of Example 1 (20–55 mg/ml) is adjusted to pH 10.5 and is activated with CNBr (10–20 mg/ml of suspension) at 25° C. The pH of the reaction mixture is maintained at 10.5 with 1 N NaCH After 10–15 minutes, the activated beads are added to an equal volume of 5mM dansyl-e-lysine or [$^3$H] glycine in 0.2 M carbonate buffer at pH 10 and the suspension is stored for 12 hours at 4° C. Uncoupled reagents are removed by extensive dialysis against several charges of 0.1 M NaCl.

Derivatized beads can be prepared by bonding e-aminocaproic acid or diaminoheptane to the beads by using the carbodiimide reaction as disclosed by Goodfriend et al.; Science (Wash. D.C.) 144:1344. 10 mg of 1-ethyl-3-(3-dimethyl aminopropyl)-carbodiimide (EDC) is added with stirring to 5 ml of bead suspension (25 mg/ml) suspended in 0.01 M diaminoheplane or 0.01 M e-aminocaproic acid at pH 6–7 and 4° C. After stirring for 2 hours in the cold, the suspension is exhaustively dialyzed against 0.1 M NaCl.

For use in cell surface-labeling experiments, purified goat antirabbit IgG antibodies can be covalently bonded to the beads by either the carbodiimide or glutaraldehyde method. In the carbodiimide reaction, 10 mg of EDC are added to 50 mg of e-aminocaproic acid derivatized latex and 1 mg of antibody in 2 ml of 0.1 M NaCl at pH 7.0 and 4° C. After 2 h the coupling reaction is stopped by the addition of 0.2 ml of 0.1 M glycine solution pH 8.0. Goat antirabbit IgG (1–2 mg) is added to 50 mg of activated latex beads in 5 ml of 0.01 phosphate buffer at pH 7.0 and the suspension is stirred for 5 hours at 25° C. The antibody-latex conjugate is separated from the uncoupled antibody as follows: The reaction suspension is layered onto a gradient consisting of a 58% (wt/wt) sucrose solution overlayered with 10% sucrose solution buffered at pH 8.0 with 0.01 M glycine. After centrifugation at 100,000 g for 3 hours in a Beckman SW-27 rotor (Beckman Instruments, Inc., Spinco Div., Palo Alto, Calif.), the latex conjugate is collected at the interface between 58 and 10% sucrose solutions. This procedure is repeated to insure complete removal of unbound antibody. Finally, the antibody-latex conjugate is dialyzed extensively against PBS at pH 7.4. Large aggregates are removed by centrifugation at 4,000 g for 10 minutes and the conjugate (15–20 mg/ml) stored at 4° C.

These new reagents offer a number of advantages and applications for the study of cell surfaces, for immunodiagnosis and immuno-therapy: (a) Latex beads can be synthesized in a wide range of sizes, densities and compositions to suit particular requirements and can be stored indefinitely. (b) Biological molecules such as antibodies, lectins, hormones, and toxins can be bound to the latex beads by any of a variety of standard chemical procedures for use in the identification of specific populations of cells, as well as in the detecton and localization of specific cell surface receptors. However, receptors which are densely distributed on the surface of cells cannot be mapped to a high resolution with these markers due to the relatively large size of the latex beads. (c) Different sizes of beads can be used in multiple-labeling experiments and in conjunction with different types of microscopy. For example, acrylic beads the size of ferritin and hemocyanin, i.e., 150–350 Å in diameter, can serve as markers for transmission electron microscopy as well as in high resolution scanning electron microscopy; beads larger than 0.2 μm in diameter can be used with ordinary light microscopy. (d) These microspheres can serve as highly sensitive fluorescent probes and quantitative reagents for biochemical and immunological studies. Binding fluorescent dyes or radioactive molecules to the microspheres instead of to the antibodies permits a high degree of tagging without adversely affecting the antibody activity. (e) The variable density beads permits fractionation and separation of specific receptor sites on the surface of the cell.

It is to be realized that only preferred embodiments of the invention have been described and that numerous substitutions, alterations and modifications may be made without departing from the spirit and scope of this invention as defined in the following claims.

What is claimed is:

1. A composition consisting essentially of a suspension of polymeric beads having an average diameter below 5 microns, having a density less than 1.15 g/cc or greater than 1.30 g/cc and comprising the cross-linked product of an ethylenically unsaturated monomer mixture including at least 10% by weight first ethylenically unsaturated monomer containing at least one substituent selected from hydroxyl, carboxyl or amino, at least 25% by weight of a second ethylenically unsaturated comonomer having a density differing from the first monomer by at least 15%, and 1–20% of a polyunsaturated cross-linking agent.

2. A composition according to claim 1 in which the first monomer is a substituted acrylic monomer present in the mixture in an amount from 20 to 60% by weight.

3. A composition according to claim 2 in which the beads are hydrophilic, swellable, porous, uniformly shaped round beads, at least 80% of which have a uniform diameter below 3 microns.

4. A composition according to claim 3 in which the first monomer is selected from acrylamide, hydroxy-lower alkyl acrylates, amino-lower alkyl acrylates, acrylic acid or methacrylic acid.

5. A composition according to claim 4 in which the first monomer is selected from compounds of the formula:

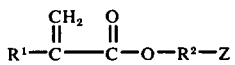

where $R^1$ is hydrogen or lower alkyl of 1–8 carbon atoms, $R^2$ is alkylene of 1–12 carbon atoms, Z is OH or $R^3$—$N^1$—$R^4$ where $R^3$ or $R^4$ are H, lower alkyl or lower alkoxy.

6. A composition according to claim 5 in which the first monomer is selected from 2-hydroxyethyl methacrylate, 3-hydroxypropyl-methacrylate, 2-dimethylaminoethylmethacrylate and 2-aminoethylmethacrylate.

7. A composition according to claim 2 in which the cross-linking agent is a polyvinyl diene or triene capable of addition polymerization with the first monomer and comonomer and is present in the monomer mixture in an amount from 5–15% by weight.

8. A composition according to claim 7 in which the cross-linking agent is selected from ethylene glycol dimethacrylate, divinyl benzene, trimethylol propane trimethacrylate, and N,N'-methylene-bis-acrylamide.

9. A composition according to claim 2 in which the comonomer is present in the monomer mixture in an amount above 40% by weight to 80% by weight.

10. A composition according to claim 9 in which the comonomer contains at least three fluorine atoms.

11. A composition according to claim 9 in which the comonomer is selected from hexafluoroisopropyl methacrylate, trifluoroethyl methacrylate, pentafluorostyrene, vinyl ethyl ketone, vinyl ethyl ether, vinyl iodide, vinyl bromide, methacryloxy-methylpentamethyl siloxane and 1,3-bis-(methacryloxymethyl)-disiloxane.

12. A method of forming a suspension of polymeric beads having a density less than 1.15 g/cc or greater than 1.30 g/cc and an average diameter below 5 microns comprising the steps of:

forming an ethylenically unsaturated monomer mixture consisting essentially of at least 10% by weight first ethylenically unsaturated monomer containing at least one substituent selected from hydroxyl, carboxyl or amino, at least 25% by weight of a second ethylenically unsaturated comonomer having a density differing from the first monomer by at least 15%, and 1–20% of a polyunsaturated cross-linking agent; and addition polymerizing the mixture to form said suspension of beads.

13. A method according to claim 12 in which the first monomer is present in the mixture in an amount from 20 to 60% by weight and is selected from acrylamide, hydroxy-lower alkyl acrylates, amino-lower alkyl acrylates, acrylic acid or methacrylic acid, the cross-linking agent is present in an amount from 5–15% by weight and is selected from ethylene glycol dimethacrylate, divinyl benzene, trimethylol propane trimethacrylate, and N,N'-methylene-bis-acrylamide, and the comonomer is present in the mixture in an amount from 40–80% by weight and is selected from hexafluoroisopropyl methacrylate, trifluoroethyl methacrylate, pentafluorostyrene, vinyl ethyl ketone, vinyl ethyl ether, vinyl iodide, vinyl bromide, methacryloxy-methylpentamethyl siloxane and 1,3-bis-(methacryloxymethyl)-disiloxane.

14. A method according to claim 13 in which the polymerization is conducted by aqueous emulsion polymerization of said monomer mixture and the total monomer content is from 3–40% by weight of the polymerization composition.

15. A composition according to claim 9 in which the comonomer is selected from vinyl fluorides, vinyl ketones, vinyl ethers, vinyl iodides, vinyl bromides, and vinyl siloxanes.

16. A protein specific reagent comprising the bead composition of claim 1 covalently bonded to a conjugate of said protein.

* * * * *